US009407747B2

(12) United States Patent
Creus et al.

(10) Patent No.: US 9,407,747 B2
(45) Date of Patent: Aug. 2, 2016

(54) MOBILE DEVICE AND METHOD

(75) Inventors: Gerard Bosch Creus, Helsinki (FI);
Mika Kuulusa, Helsinki (FI); Juha E. Savolainen, Helsinki (FI); Tanya Widen, Helsinki (FI); Jaakko Kyro, Helsinki (FI); Thomas Hubbard, Woburn, MA (US); Juan Feng, Vantaa (FI); Hannu Esala, Vihti (FI); Mikko Siltanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 749 days.

(21) Appl. No.: 11/375,531

(22) Filed: Mar. 14, 2006

(65) Prior Publication Data
US 2007/0219732 A1 Sep. 20, 2007

(51) Int. Cl.
*H04M 1/24* (2006.01)
*H04W 52/02* (2009.01)

(52) U.S. Cl.
CPC ............ *H04M 1/24* (2013.01); *H04W 52/0251* (2013.01)

(58) Field of Classification Search
CPC .......................... H04M 1/24; H04W 52/0251
USPC .................. 702/57, 60–68, 70; 320/134, 136
See application file for complete search history.

(56) References Cited

U.S. PATENT DOCUMENTS

| | | | | |
|---|---|---|---|---|
| 5,809,449 A * | 9/1998 | Harper | | 702/63 |
| 6,078,871 A * | 6/2000 | Anderson | | 702/63 |
| 6,459,906 B1 * | 10/2002 | Yang | | 455/556.1 |
| 6,483,291 B1 * | 11/2002 | Bhateja et al. | | 324/142 |
| 6,563,766 B1 * | 5/2003 | Nakamiya | | 368/64 |
| 6,714,016 B2 * | 3/2004 | Odaohhara et al. | | 324/427 |
| 6,975,095 B2 * | 12/2005 | Ooi et al. | | 320/132 |
| 7,019,659 B2 * | 3/2006 | Kobayashi et al. | | 340/636.1 |
| 7,407,108 B1 * | 8/2008 | Euler et al. | | 235/472.01 |
| 7,469,161 B1 * | 12/2008 | Gandhi et al. | | 607/29 |
| 7,620,452 B1 * | 11/2009 | Russie | | 607/29 |
| 2003/0004662 A1 * | 1/2003 | Mitchell et al. | | 702/63 |
| 2003/0197512 A1 * | 10/2003 | Miller et al. | | 324/426 |
| 2003/0222867 A1 * | 12/2003 | Bean et al. | | 345/211 |
| 2004/0056985 A1 * | 3/2004 | Seong | | 348/838 |
| 2005/0032525 A1 * | 2/2005 | Gasbarro | | 455/456.1 |
| 2005/0046390 A1 * | 3/2005 | Kimura | | 320/132 |
| 2005/0174093 A1 * | 8/2005 | Chen | | 320/132 |
| 2005/0281543 A1 * | 12/2005 | Takahashi et al. | | 386/117 |
| 2006/0238533 A1 * | 10/2006 | Chen | | 345/211 |
| 2007/0118310 A1 * | 5/2007 | Kindseth et al. | | 702/64 |
| 2007/0183678 A1 * | 8/2007 | Sankar et al. | | 382/254 |

* cited by examiner

*Primary Examiner* — Janet Suglo
(74) *Attorney, Agent, or Firm* — Alston & Bird LLP (57) ABSTRACT

Event triggered snapshots of display content of software applications facilitate for a user, typically in the role of a software application developer, in the process of power-optimizing an application under development. The invention provides the developers with an ability to correlate specific software application events, e.g. user interface events, to power consumption peaks and lows.

16 Claims, 6 Drawing Sheets

MOBILE DEVICE AND METHOD

FIELD OF THE INVENTION

The present invention relates to a method for monitoring power consumption in a mobile battery operated device, a mobile battery operated device and a computer program performing such a method.

BACKGROUND

Power consumption of mobile battery operated devices such as mobile communication terminals is expected to increase as the demand for enhanced functionality increases.

For example, there is a demand for communication terminals that are capable of communicating in a plurality of different communication systems, including second generation systems such as GSM/GPRS and third generation systems such as WCDMA/EGPRS/HSDPA as well as WLAN systems of the 802.11 family. Moreover, increased power consumption is due also to other hardware parts of a typical communication terminal, especially the applications processor and the main display. In addition, advanced features exploiting the hardware functionality contribute to this increase, e.g. 3D games, video players, etc.

Such terminals will consume much more energy in comparison with earlier terminals, these earlier terminals having only limited functionality and, e.g., being capable of communicating in only a single communication system.

With the current progress in battery capacity unable to keep pace with the increasing demands posed by such feature-rich mobile devices, new ways to control and sensibly reduce the power consumption of terminals are needed. Hardware solutions typically involve implementation of circuitry having inherently low power consumption. Such hardware solutions may involve the use of specific materials as well as reducing the number of components to a minimum. Needless to say, hardware solutions are not very flexible and they provide a very limited amount of functionality.

Software solutions, on the other hand, typically offer an advantage over purely hardware-based solutions in that software can keep track of the context of the monitored device and thus make it possible for a software developer to make more sensible decisions as to when and where to optimize power. However, it is only through complex setup of expensive external digital measuring equipment and configuration of dedicated and specialized software that this is feasible in the prior art. That is, visibility of the energy and power consumption of an application in the prior art is possible only through the use of external equipment. A developer need to perform more or less complex configuration procedures to set up the equipment in order to find out where to optimize the operation of a device.

A drawback related to prior art methods and devices is hence that an application developer, when developing a software application for execution in a mobile communication device, has a very limited capability of optimizing the software application in terms of its effect on the power consumption by the device. In fact, an application developer typically has no way of finding out how battery lifetime is effected by a software application being developed.

SUMMARY OF THE INVENTION

An object of the present invention is to overcome drawbacks related to prior art as discussed above. This object is achieved in different aspects by way of a method, a terminal and a computer program according to the appended claims.

Hence, in a first aspect, there is provided a method for monitoring power consumption in a mobile battery operated device comprising electric circuitry, a display and a battery. The method comprises the steps of executing a software application, during which the software application at least generates display content, detecting, at a plurality of instants of time, at least one electric quantity representative of power output from the battery, detecting at least one triggering event, and, in response to the at least one triggering event, recording at least a respective subset of the display content generated by the software application.

The detection of at least one triggering event may comprise detecting a signal generated via the electric circuitry in response to a user action, such as detecting a signal from a keypad when a user manipulates a key.

The at least one triggering event may also be generated by way of analysing a plurality of the at least one electric quantity representative of power output in terms of peak values as well as in terms of gradients and changes of gradients.

The detection of the at least one triggering event may also comprise detecting a timing signal. In other words, the triggering event may also be of a more general character, e.g. generated at specific points time by a timing function. In fact, the way in which the event triggering is performed may vary—as long as a triggering event is generated that is detectable.

The recorded display content may be displayed on the display of the terminal. Typically, such a displaying takes place subsequent to a number of detections of triggering events and recordings of display contents. However, displaying of the display content may also be performed in response to the at least one triggering event.

Power level indicators that are representative of the detected electric quantity representative of power output may be displayed. This may entail displaying a graph of power level indicators with respect to time. That is, a function of power level samples with respect to time may be displayed. Similar to the displaying of the display content, the displaying of power level indicators typically takes place subsequent to a number of detections of triggering events and recordings of display contents. However, displaying of the power level indicators may also be performed during actual monitoring.

A graphic triggering event indicator corresponding to a point in time associated with a detected triggering event may also be displayed. For example, a graphic symbol such as a vertical line, a rectangle, a circle, a cross, a shaded area etc., may be displayed to enhance and call attention to a specific part of a displayed graph.

The displaying of the display content and the displaying of the power level indicators may be such that they blend in with each other, while at the same time being visible to a viewer.

The at least one detected electric quantity representative of power output may also be recorded in the form of a time series of values. This recorded time series of recorded values may furthermore be provided, e.g. via a suitable communication channel, for use in an analysis system that is external to the battery operated device that is being subject to the power consumption monitoring.

Similarly, a respective time point associated with each recorded display content may also be recorded and also provided, together with the respective recorded display content, for use in an analysis system.

In a second aspect, there is provided a mobile battery operated device configured for monitoring power consumption. The device comprises electric circuitry, a display and a battery as well as means for executing a software application, during which the software application at least generates display content, means for detecting, at a plurality of instants of time, at least one electric quantity representative of power output from the battery, means for detecting at least one triggering event, and means for, in response to the at least one triggering event, recording at least a respective subset of the display content generated by the software application.

In a third aspect, there is provided a computer program comprising software instructions that, when executed in a battery operated device, performs the method as described above.

To summarize, the invention makes use of display content such as graphical user interface snapshots to help a user, typically in the role of a software application developer, in the process of power-optimising an applications. The invention provides the developers with an ability to correlate specific software application events, such as user interface events, to power consumption peaks and lows, e.g. when connecting to an entity in a communication system and when forcing radio circuitry to activate, or when executing a computing-intensive operation that results in an overall increase in the power consumption.

This approach may make use of algorithms to analyse and identify power critical events (e.g. peaks and lows in the power graph, along with radical changes in the gradient of its first derivative or any higher derivative) in time as the power profiling goes on, in real-time. The identification of a critical event triggers the inventive, software implemented, method to record an instant snapshot of the current application display. Needless to say, this operation should also be optimised such that it interferes as little as possible with the normal execution of the application being profiled. Such optimisation is, however, outside the scope of the present invention.

The user interface snapshots offer visual hints to a user as to where the power consumption critical events are located within an application. This provides a much faster power profiling of applications as well as providing, to the user, an intuitive sense for "power hogs" within an application. That is, a user may develop a feeling for those operations that cause peaks and lows in the power graph. This enables a user to be more conscious about the energy expenditure of a software application under development. While many software application developers would claim "just not having time" for detailed power tracing, the method provided by the present invention may even be a fun activity to perform after an application is finally up-and-ready from a functional standpoint.

In fact, the situation is typically such that, by making only little changes to a particular software implementation, it may have a great impact to the overall power consumption in a battery operated device. For example, optimisation may be achieved in terms of buffering sizes etc., especially for applications that are executed very often in a battery operated device.

An advantageous result provided by the present invention is hence that it facilitates for developers to get involved in power consumption optimization tasks and thereby the software applications being developed will make effective use of the available power. For example, an application developer may utilize the invention in order to find out how battery lifetime is effected by a software application being developed. This is typically a notion familiar to software developers, as opposed to current and power consumption.

As an added advantage, the approach according to the invention provides a way to obtain a highlight summary of an application's history, in a series of screenshots at relevant points in time, which may facilitate activities such as debugging and documentation.

PREFERRED EMBODIMENTS

Although the present invention will be exemplified below with a mobile communication terminal, it is to be understood that the communication terminal is representative of any battery operated device.

Figure 1:
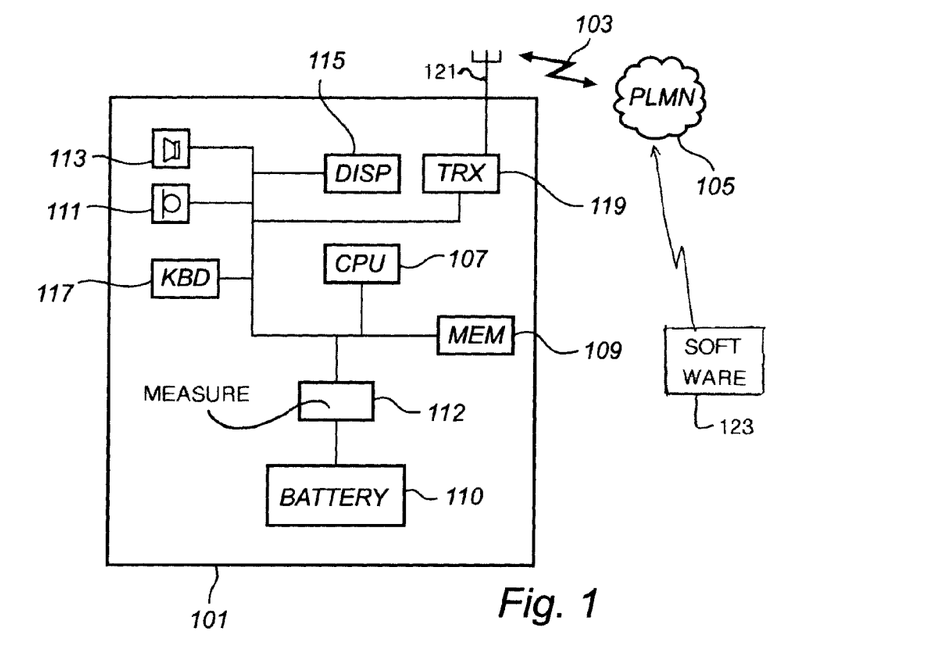
FIG. 1 shows schematically a block diagram of a communication terminal according to the present invention.

FIG. 1 illustrates schematically a communication terminal 101 in which the present invention is implemented. It should, however, be understood that the invention is not limited to communication terminals, but may be applied to any device where power optimization is deemed important, e.g. in a laptop computer, and that the terminal 101 in FIG. 1 is only an example of such a device.

The terminal 101 is capable of communication via an air interface 103 with a radio communication system 105 such as the well known mobile communication systems GSM/GPRS, WCDMA/EGPRS/HSDPA, CDMA2000 and also data communication systems such as the 802.11 family of WLAN standards.

The terminal 101 comprises electric circuitry in the form of a processor 107, memory 109 as well as input/output units in the form of a microphone 111, a speaker 113, a display 115 and a keyboard 117. Radio communication is realized by radio circuitry 119 and an antenna 121. The details regarding how these units communicate are known to the skilled person and is therefore not discussed further. The terminal 101 further comprises a power source in the form of a battery 110. The battery 110 provides power to all circuitry in the terminal 101 via a power measuring unit 112. The power measuring unit 112 detects, at specific instants in time, voltage and current and provides an output signal to the processor 107 that is proportional to the electric power provided by the battery 110. The instants in time at which the measuring is performed may, e.g., be provided by the processor 107, but may also be predefined and stored within the power measuring unit 112.

The communication terminal 101 may for example be a mobile telephone terminal, a PDA, a portable personal computer, a portable gaming console, a multimedia portable center, or an MP3 player with a rich visualization display, etc.

The method according to the present invention will in general reside in the form of software instructions, together with other software components as described in connection with FIG. 1, in the memory 109 of the terminal. The software instructions of the inventive notification function may be provided into the memory 109 in a number of ways, including distribution via the network 105 from a software supplier 123.

Turning now to FIGS. 2 and 3*a-c*, in addition to FIG. 1, a method according to the present invention will be described. The method is typically implemented by way of software residing in memory means and executed by processing means in a communication terminal, such as the terminal 101 described above with reference to FIG. 1.

Figure 2:
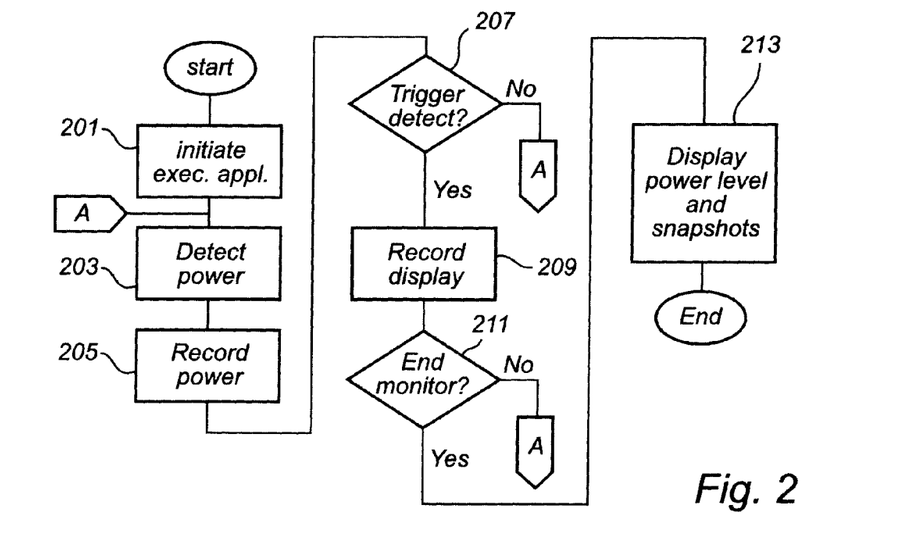
FIG. 2 is a flow chart of a method according to the present invention.

In an execution initiation step 201, a software application that is to be subject to power monitoring is started and continues to operate according to it's specific software instructions, including such operations as displaying information and controlling the terminal 101 in any appropriate manner.

In a power detection step 203, the method according to the invention performs a detection of the power provided by the battery 110. As discussed in connection with FIG. 1, the power detection may be performed in terms of measuring voltage and current provided by the battery 110.

The detected power level is then recorded, i.e. stored for later displaying as will be discussed below, in a recording step 205.

In a trigger detection step 207 any triggering event, such as a user pressing a key on the keypad 117 is detected. The triggering event may also be generated by way of analysing a plurality of power output values in terms of peak values as well as in terms of gradients and changes of gradients.

If no triggering event is detected, the method returns to the power detection step 203.

After detecting a triggering event in step 207, a snapshot is recorded, in a recording step 209, of the current content of the display output by the application being monitored. By this, the recorded power level is associated with the recorded display content.

In a checking step 211, decision is made whether or not the monitoring is to be continued or not. If it is decided to continue, the method returns to the power detection step 203.

If it is decided not to continue with the monitoring of power usage, the method continues to display the results of the monitoring. The recorded display content is then displayed, together with the corresponding recorded power levels, in a display step 213. The displaying of the display content may be simultaneous with the displaying of the power level indicators in such a manner that they blend in with each other, while at the same time being visible to a viewer. The displaying may also be simultaneous in that the displaying of power level indicators are partly covered by the displaying of the recorded display content of the software application.

As the skilled person will realize, termination of the monitoring may occur as a result of any other appropriate user interaction known in the art during any of the steps described.

An alternative implementation of the method as described with reference to FIG. 2 may include displaying of the recorded power levels and the recorded snapshots during the actual monitoring. That is, the recording steps 205 and 209 may include displaying of the power level and the display content, respectively.

Figure 3A:
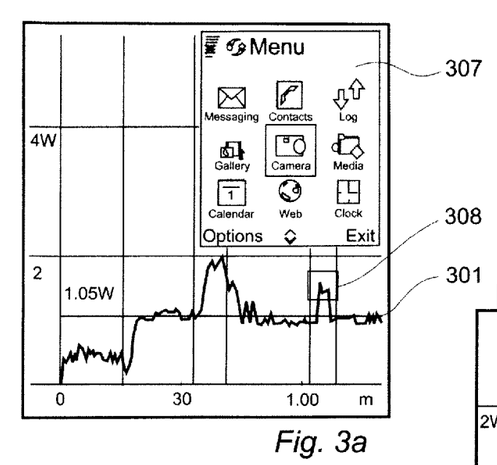
FIGS. 3a and 3b illustrate content displayed on a terminal display corresponding to the method illustrated in FIG. 2.
Figure 3B:
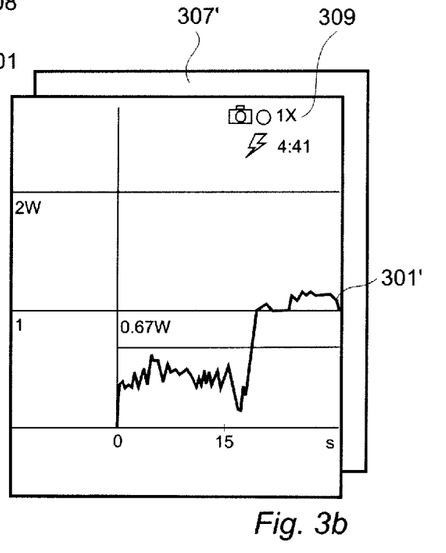
Figure 4:
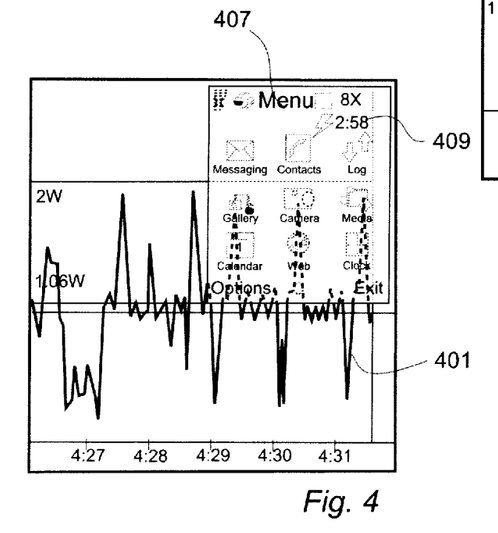
FIG. 4 is a screenshot of a terminal display on which a power level graph and an application screenshot is displayed in a blended manner.

Turning now to FIGS. 3*a*, 3*b* and 4, content displayed on a terminal display will be described with reference to the method of FIG. 2.

FIG. 3*a* illustrates a display of the terminal 101 resulting from the content display step 209 of FIG. 2. That is, after a triggering event has been detected in step 207. Recorded display content 307 from the monitored software application is displayed on top of a graph of a time series of power level indicators 301. The graph 301 is plotted in terms of power (W) against time and, as FIG. 3*a* shows, the power output has been detected for about 75 seconds and during that time period has varied between 0 W and 2 W. Peaks are observed at 40 seconds (2 W) and 65 seconds (1.5 W). A graphic indicator 308 is shown at the 1.5 W power level peak at 75 seconds. This peak has been detected by a suitably configured peak detection algorithm, as discussed above.

FIG. 3*b* illustrates a situation preceding that of FIG. 3*a*, i.e. the power level graph 301' during the initial 30 seconds of monitoring. Display content 307' generated by the monitored application is indicated in FIG. 3*b* as being "behind" the displaying of the graph 301'. This is to illustrate that the monitored application may be executed in a "background mode", while a user of the monitoring method views the output (i.e. the graph 301') of detected power levels. Other information pertaining to the monitoring may be presented along with the graph 301', as exemplified by symbols 309. For example, as indicated in FIG. 3*b*, an indication regarding remaining time for battery operation of the terminal may be presented.

FIG. 4 is a screenshot of a terminal display on which a power level graph 401 and an application screenshot 407 is displayed in a blended manner. Such a configuration may be of particular benefit in a case where a display is small and a presentation of a graph and a snapshot of a monitored application would crowd the display unnecessarily. Similar to the screenshot of FIG. 3*b*, any information pertaining to the monitoring may be presented along with the graph 401, as exemplified by symbols 409.

Turning now to FIGS. 5 to 8, the appearance of a terminal display during different operational modes will be illustrated.

Figure 5A:
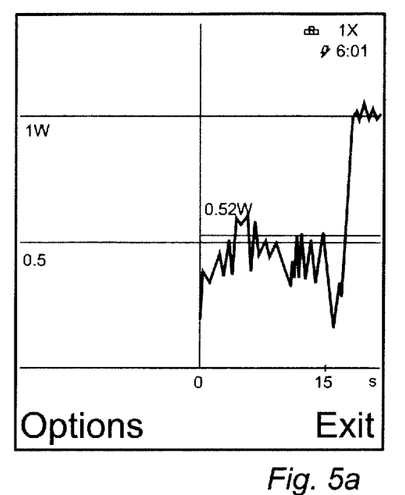
FIGS. 5a-d are screenshots of a terminal display during a recording mode.
Figure 5B:
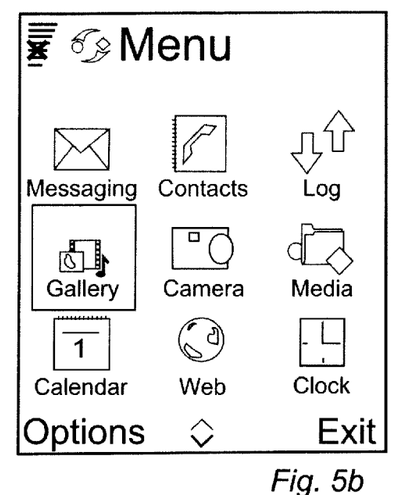
Figure 5C:
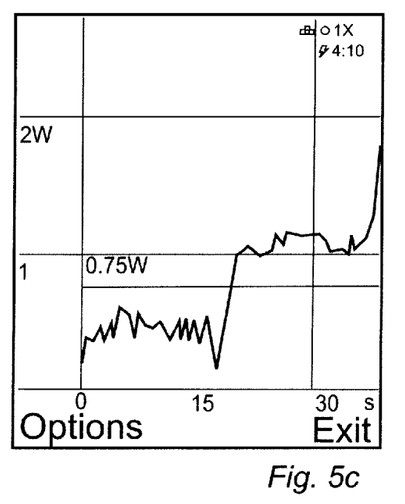
Figure 5D:
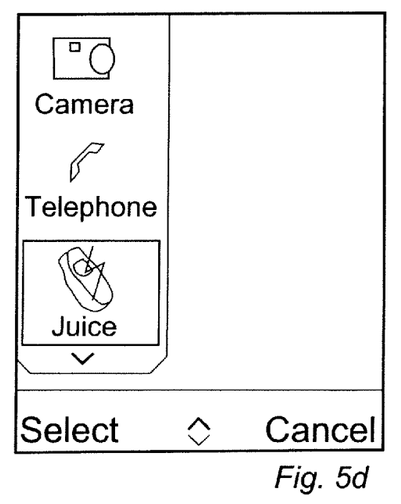

FIGS. 5*a-d* illustrate a sequence of screenshots of a terminal display during a recording mode. FIG. 5*a* illustrates a point in time when detection of power consumption has been in operation for about 20 seconds and a power level graph has been displayed. FIG. 5*b* illustrates the appearance of the terminal display when the terminal display has been controlled to display the software application that is being subject to the power monitoring method. That is, the detection and recording of power output continues to operate in a "background mode". A user then triggers, e.g. by pressing a key on the terminal, the power monitoring method to record the display content as shown in FIG. 5*b*. Although not illustrated in FIG. 5, the user may perform a plurality of triggering actions while operating the software application, each triggering action causing a recording of the display content. Recording of display content may also be automatically triggered, as discussed above. FIG. 5*c* illustrates the appearance of the terminal display when the terminal display has been controlled to again display the power level graph, now at a point in time 40 seconds after initial start of the power monitoring. FIG. 5*d* illustrates the appearance of the terminal display when the terminal display has been controlled to display the currently running applications, including the power monitoring method "Juice", a telephone application and a Camera application.

Figure 6A:
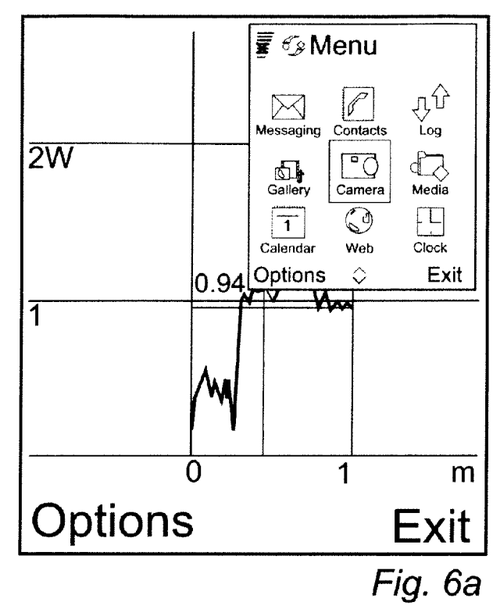
FIGS. 6a-b are screenshots of a terminal display during a viewing mode.
Figure 6B:
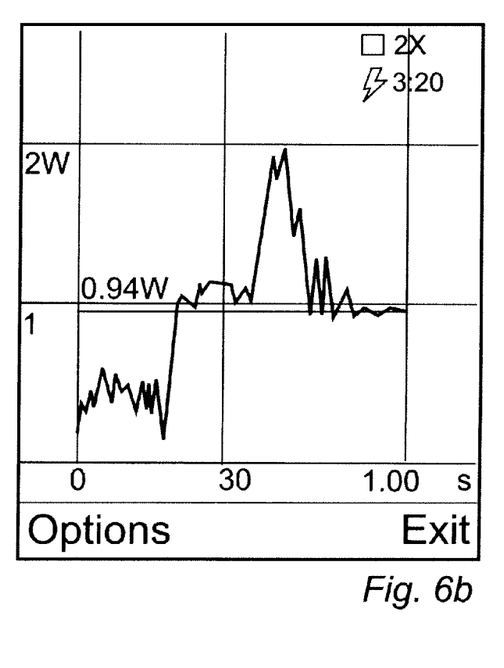

FIGS. 6*a-b* illustrate a sequence of screenshots of a terminal display during a viewing mode. That is, FIGS. 6*a-b* illustrate a situation subsequent to the recording mode that is illustrated in FIGS. 5*a-d*. FIG. 6*a* illustrates the terminal display on which the power graph is displayed and where a screenshot is displayed. FIG. 6*b* illustrates the terminal display on which the power graph is displayed in more detail. The power graph has been scrolled and slightly expanded to show more detail.

Figure 7A:
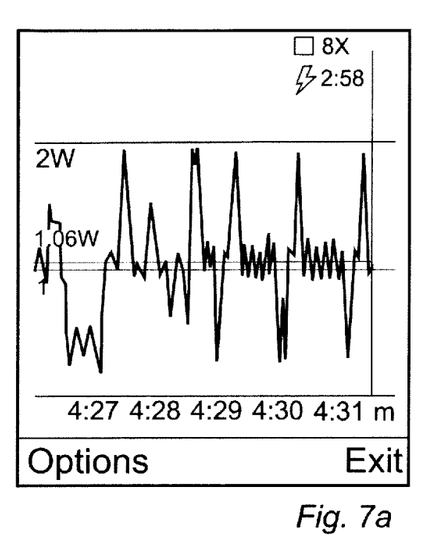
FIGS. 7a-d are screenshots of a terminal display during scrolling.
Figure 7B:
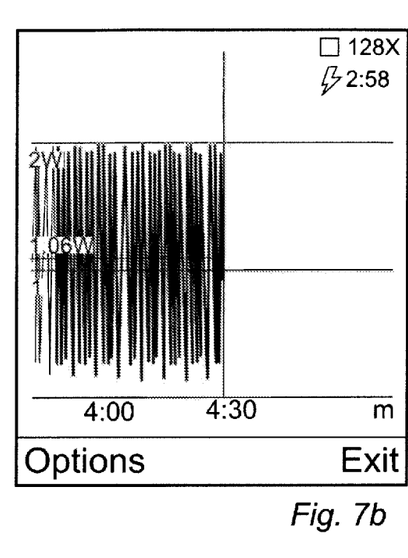
Figure 7C:
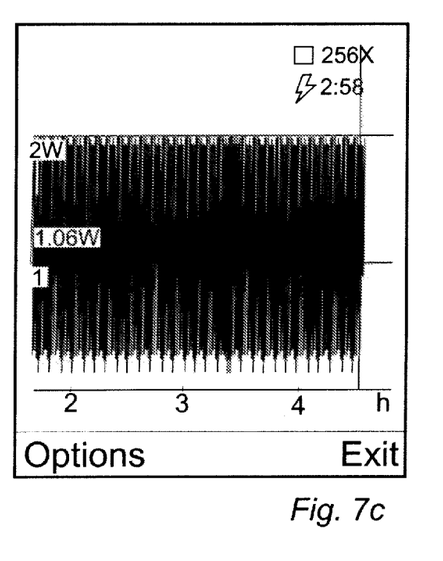
Figure 7D:
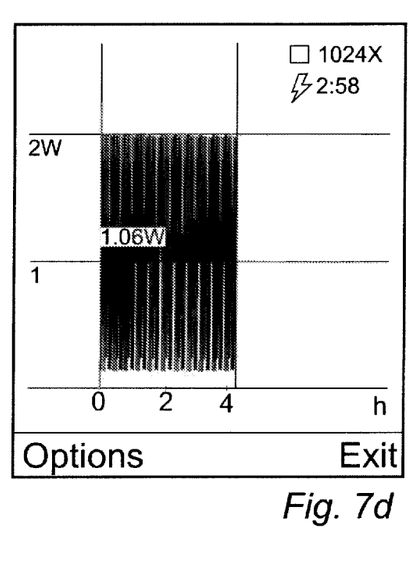

FIGS. 7*a-d* illustrate a sequence of screenshots of a terminal display, illustrating a power graph extending for 4 hours. FIG. 7*a* illustrates the power graph during a time interval extending from 4 minutes, 27 seconds to 4 minutes, 32 seconds. FIG. 7b illustrates the power graph during a time interval extending from 3 minutes, 40 seconds to 4 minutes, 32 seconds. FIG. 7c illustrates the power graph during a time interval extending from 1 hour, 45 minutes to 4 hours, 45 minutes. FIG. 7d illustrates the power graph during a time interval extending from 0 hour, 0 minutes to 4 hours, 45 minutes.

Figure 8A:
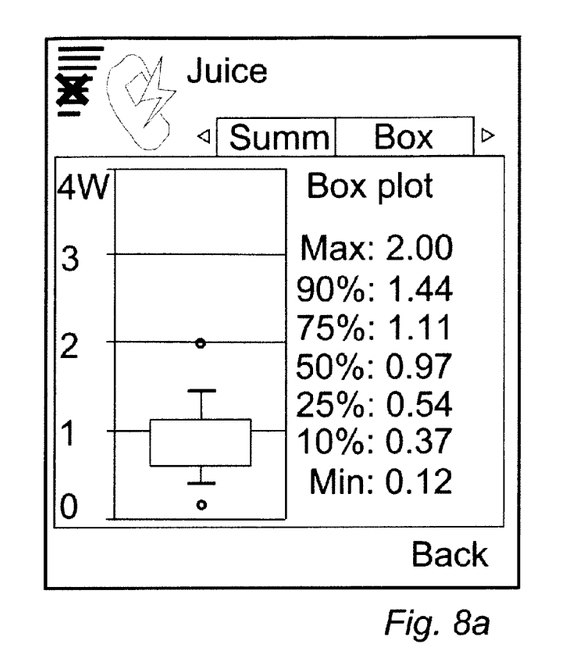
FIGS. 8a-b are screenshots of a terminal display during displaying of statistics.
Figure 8B:
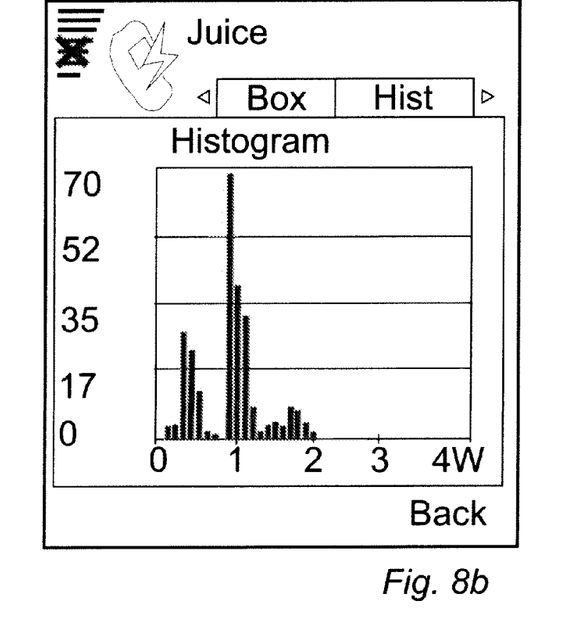

FIGS. 8a-b illustrate screenshots of a terminal display when a user has operated a statistic analysis application on data output from, e.g., the power monitoring method described above. FIG. 8a illustrates a box plot and FIG. 8b illustrates a histogram plot.

Hence, in summary, the present invention provides event triggered snapshots of display content of software applications that facilitate for a user, typically in the role of a software application developer, in the process of power-optimising an application under development. The invention provides the developers with an ability to correlate specific software application events, e.g. user interface events, to power consumption peaks and lows.

What is claimed is:

1. A method for monitoring power consumption in a mobile battery operated device, the device comprising electric circuitry, a display and a battery, the method comprising:
    executing a first software application on the mobile battery operated device, during which the first software application at least generates display content for viewing via a graphical user interface on the display of the mobile battery operated device, the display content presenting information obtained from execution of the first software application;
    executing a second software application, on the mobile battery operated device, providing for a monitoring of power consumption in the battery in the mobile battery operated device resulting from the execution of the first software application and its corresponding display content, said monitoring of power consumption by operation of said second software application comprising:
        detecting, at a plurality of instants of time, at least one electric quantity representative of power output from the battery;
        detecting at least one triggering event in the at least one electric quantity representative of power output from the battery;
        in response to the at least one triggering event, recording a snapshot of at least a respective subset of the display content generated by the first software application and displayed on the graphical user interface; and
        causing the recorded display content to be displayed on said display;
        causing the power consumption obtained by operation of said second software application at the time when the recording is made to be displayed on said display; and
    causing a blended display of the recorded display content to be displayed on the graphical user interface, obtained by operation of said first software application, and the displayed power consumption obtained by operation of said second software application, the blended display comprising the recorded display content concurrent with the power consumption monitored at the time of the recorded display content.

2. The method according to claim 1, wherein detecting at least one triggering event comprises detecting a signal generated via said electric circuitry in response to a user action.

3. The method according to claim 2, wherein the detecting of a signal comprises detecting a signal from a keypad.

4. The method according to claim 1, wherein the at least one triggering event is generated by way of analysing a plurality of said at least one electric quantity representative of power output in terms of any of peak values, gradients and changes of gradients.

5. The method according to claim 1, wherein detecting at least one triggering event comprises detecting a timing signal.

6. The method according to claim 1, wherein the displaying of the recorded display content is performed in response to the at least one triggering event.

7. The method according to claim 1, wherein displaying power consumption comprises displaying a graph of power consumption with respect to time.

8. The method according to claim 1, further comprising displaying a graphic triggering event indicator corresponding to a point in time associated with a detected triggering event.

9. The method according to claim 1, further comprising:
    recording the at least one detected electric quantity representative of power output in the form of a time series of values.

10. The method according to claim 9, further comprising:
    providing the recorded time series of values for use in an analysis system.

11. The method according to claim 1, further comprising:
    recording a respective time point associated with each recorded display content.

12. The method according to claim 11, further comprising:
    providing the recorded time points and the respective recorded display content for use in an analysis system.

13. An apparatus comprising at least one processor and at least one memory storing computer program code, wherein the at least one memory and stored computer program code are configured, with the at least one processor, to cause the apparatus to at least:
    execute a first software application, during which the first software application at least generates display content that is viewable via a graphical user interface, the display content configured to present information obtained from execution of the first software application;
    execute a second software application that is configured to monitor power consumption that results from the execution of the first software application and its corresponding display content, the second software application is further configured to:
        detect, at a plurality of instants of time, at least one electric quantity representative of power output from the battery;
        detect at least one triggering event in the at least one electric quantity representative of power output from the battery;
        in response to the at least one triggering event, record a snapshot of at least a respective subset of the display content generated by the first software application; and
        cause the recorded display content to be displayed via the graphical user interface;
        cause the power consumption obtained by operation of said second software application at the time when the recording is made to be displayed via the graphical user interface; and
    cause a blended display of the recorded display content to be displayed via the graphical user interface, obtained by operation of said first software application, and the displayed power consumption obtained by operation of said second software application, the blended display comprising the recorded display content concurrent with the power consumption monitored at the time of the recorded display content.

14. The apparatus of claim 13, wherein the at least one memory and stored computer program code are configured, with the at least one processor, to cause the apparatus to analyze a plurality of said at least one electric quantity representative of power output in terms of any of peak values, gradients and changes of gradients.

15. The apparatus of claim 13 wherein the at least one memory and stored computer program code are configured, with the at least one processor, to cause the apparatus to detect a signal generated by the electric circuitry in response to a user action.

16. A computer program product comprising at least one non-transitory computer-readable storage medium having computer-readable program instructions stored therein, the computer-readable program instructions comprising:
  program instructions configured to execute a first software application, during which the first software application at least generates display content that is viewable via a graphical user interface, the display content configured to present information obtained from execution of the first software application;
  program instructions configured to execute a second software application that is configured to monitor power consumption that results from the execution of the first software application and its corresponding display content, the second software application further comprises program instructions configured to:
    detect, at a plurality of instants of time, at least one electric quantity representative of power output from the battery;
    detect at least one triggering event in the at least one electric quantity representative of power output from the battery;
    in response to the at least one triggering event, record a snapshot of at least a respective subset of the display content generated by the first software application;
    cause the recorded display content to be displayed via the graphical user interface; and
    cause the power consumption obtained by operation of said second software application at the time when the recording is made to be displayed via the graphical user interface; and
  program instructions configured to cause a blended display of the recorded display content to be displayed via the graphical user interface, obtained by operation of said first software application, and the displayed power consumption obtained by operation of said second software application, the blended display comprising the recorded display content concurrent with the power consumption monitored at the time of the recorded display content.

* * * * *